Aug. 30, 1960 — W. R. GAMBILL ET AL — 2,950,604
HEAT TRANSFER METHOD
Filed June 8, 1959 — 2 Sheets-Sheet 2

INVENTORS
Wallace R. Gambill
Norman D. Greene
BY
ATTORNEY

United States Patent Office 2,950,604
Patented Aug. 30, 1960

2,950,604

HEAT TRANSFER METHOD

Wallace R. Gambill, Oak Ridge, Tenn., and Norman D. Greene, La Jolla, Calif., assignors to the United States of America as represented by the United States Atomic Energy Commission Filed June 8, 1959, Ser. No. 818,985

3 Claims. (Cl. 62—5)

Our invention relates generally to heat transfer under localized boiling conditions at the heat transfer surface, and more particularly to a method of increasing the rate of heat transfer under such conditions without incurring burnout of the heat transfer surface.

In heat transfer from a source to a liquid coolant, across a liquid-retaining conduit wall, a gaseous phase forms on the inner wall of the conduit whenever the temperature of the wall exceeds the local boiling point of the liquid. As the rate of heat transfer is increased by raising the temperature of the source, there is a corresponding increase in the bubble population on the inner wall until the population reaches a critical value that prevents heat from being removed from the surface at a rate equal to the rate of heat generation at the source. At this point, the temperature of the liquid-retaining wall increases rapidly and a fusion failure or burnout results. In such heat transfer systems, the burnout point represents the highest heat flux obtainable under localized boiling conditions.

Nucleate boiling heat transfer is utilized in innumerable situations, most of which are not severely handicapped by the limit imposed on heat transfer by burnout, primarily because it is possible and economical to provide a sufficient heat transfer area to allow the required amount of heat to be transferred at a rate below burnout. However, in situations where performance of a device is dependent either entirely or to a major degree upon the maximum rate of heat transfer that is obtainable, and only a limited heat transfer area is available, maximum performance is limited by the burnout phenomenon. Examples of such devices include neutronic reactors where heat transfer area is limited because high power densities are required, and the maximum power is dependent solely on the rate of heat removal, and liquid-propellant rocket motors, where performance is limited by propellant temperature which is in turn limited by the ability of materials of construction to withstand high temperatures.

It is well known that burnout heat fluxes can be increased by increasing the axial rate of fluid flow past the heat transfer surface, thereby increasing the shear rate which apparently reduces bubble population. This technique is, however, limited because the power required to increase the axial rate of flow increases exponentially with the increase in burnout heat flux that is obtained. A point is quickly reached where the velocity can no longer be practically increased. The maximum heat flux reported in the literature for axial flow heat transfer is approximately 14,000,000 B.t.u./hr./ft.² (Glasstone, S., Principles of Nuclear Reactor Engineering, p. 695, D. Van Nostrand, New York (1955)).

Since axial flow is limited in its effects on increasing burnout heat transfer, a recent study was made to determine the effects of spinning flow, specifically to determine if spinning flow would produce increased burnout heat fluxes over axial flow at equal pumping powers (Nuclear Science Abstracts, vol. 13, No. 2, Abstract No. 872). It proceeded on the theory that the centrifugal acceleration produced by a spinning flow would remove the bubbles that form on the heat transfer surface. This study utilized rotational velocities sufficient to produce centrifugal accelerations at the tube wall of a few hundred $g$ ($g=32.174$ ft./sec.²). Although slight improvements over axial flow were detected as a result of this work, the magnitudes of these improvements were not large enough to justify the costs and inconvenience of installing the spin generating equipment in heat transfer systems. The conclusion of the study indicated that the improvements detected were insufficient and that an increase in spin would not yield improvements of greater magnitude.

We have now independently found, however, that when the centrifugal acceleration is very greatly increased, i.e., by at least an order of magnitude above that previously employed, the improvement in burnout heat flux over axial flow at equal pumping powers increases, and that the improvement reaches practical significance when the rotational velocity becomes sufficient to produce a centrifugal acceleration at the tube wall of at least 10,000 $g$. At 10,000 $g$, the improvement over axial flow at equal pumping powers is nearly 100 percent.

In describing our invention in greater detail, reference is made to the drawings wherein.

Figure 1:
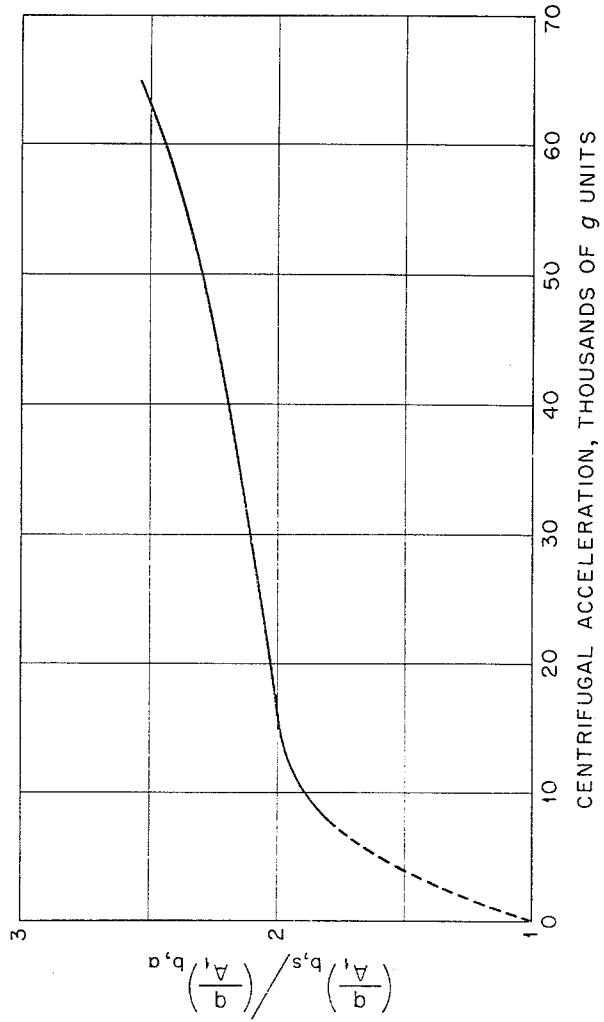
Fig. 1 is a plot of the improvement of spinning flow burnout over axial flow burnout at equal pumping powers on the ordinate versus centrifugal acceleration at the heat transfer surface, expressed in $g$, on the abscissa.

Referring now to Fig. 1, the unit of the ordinate $(q/A_1)b,s/(q/A_1)b,a$ is a ratio of the burnout heat flux attained using spinning flow $(q/A_1)b,s$ to the burnout heat flux attained using axial flow $(q/A_1)b,a$, at equal pumping powers. In the unit, the term:

$q$=heat transfer rate, B.t.u./hr.;
$A_1$=area of inside heat transfer surface, sq. ft.;
$b$=subscript denoting burnout;
$s$=subscript denoting spinning flow; and
$a$=subscript denoting axial flow.

It can be seen that this unit expresses the advantages of spinning flow over axial flow at equal pumping powers. Our discovery is illustrated by the curve of Fig. 1. In contra-distinction to the findings of the earlier study referred to above, we have discovered that the improvement effected by spinning flow increases as the spin is increased, that significant improvements can be achieved, and that such significant improvements can be achieved rapidly, as is indicated by the steep slope of the curve in the region below $10^4$ $g$. It will also be noted that spinning flow becomes increasingly advantageous as the acceleration is increased above $10^4$ $g$.

As can be seen from an examination of Figure 1, the length to diameter ratio ($L/D$) does not affect the magnitude of the improvement that spinning flow yields over axial flow. However, $L/D$ does have an effect on the absolute burnout rates that can be achieved using either spinning or axial flow, but since each type of flow is affected to substantially the same degree by L/D, there is no effect on the improvement.

Figure 2:
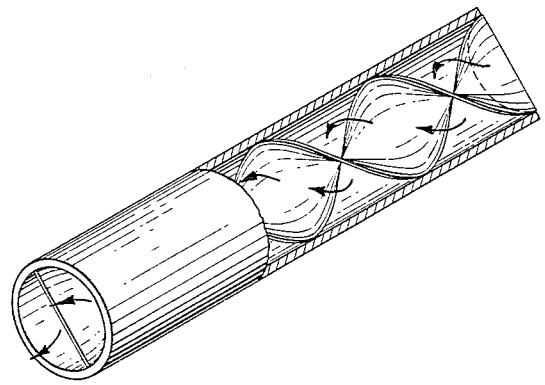
Fig. 2 is a perspective view of a tube containing a twisted tape.

The manner in which the rotational component of velocity is imparted to the flowing fluid is not particularly critical. A suitable method involves the use of a twisted flat tape which fills the interior of the tube and provides a helical channel through which the fluid is passed. The pitch or number of turns per unit length of tape determines the ratio of rotational velocity to axial velocity, which is a constant for a specific tape. The centrifugal acceleration is, however, for a fixed radius of curvature dependent only on the magnitude of the rotational component of velocity; therefore, with a specific tape, any amount of centrifugal acceleration can be achieved, limited, of course, by the magnitude of the highest axial velocity obtainable. A typical tube containing a twisted tape is illustrated in Fig. 2.

A second suitable method for the generation of a spinning flow involves the use of entrance generators. There are two general types of such generators, namely, the tangential inlet generator and the spiral ramp generator. A typical spiral ramp generator is illustrated in Fig. 3.

Figure 3:
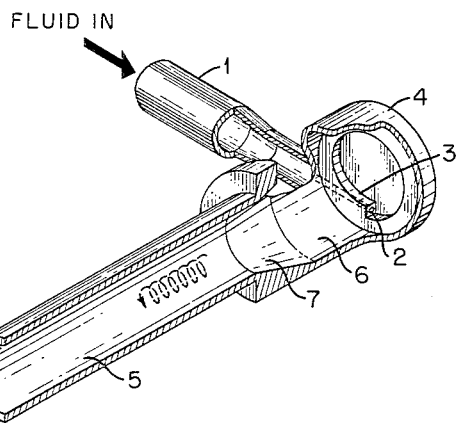
Fig. 3 is a perspective view of a spiral ramp inlet generator.

Referring to Fig. 3, inlet tube 1 and orifice 2 provide ingress to a spiral ramp 3, which is defined by the closed end of the generator body 4. A heat transfer tube 5 is connected to spiral ramp 3 by means of a cylindrical passageway 6 and an accelerating cone 7. In operation, a coolant enters the generator through the inlet tube 1 and orifice 2 and emerges on the spiral ramp 3, where a rotational component of velocity is imparted. The rotating coolant then travels through passageway 6 to the accelerating cone 7, where the rotational component of velocity is increased. The coolant leaves the accelerating cone and passes through the heat transfer tube in the manner shown by the dotted arrow.

Figure 4:
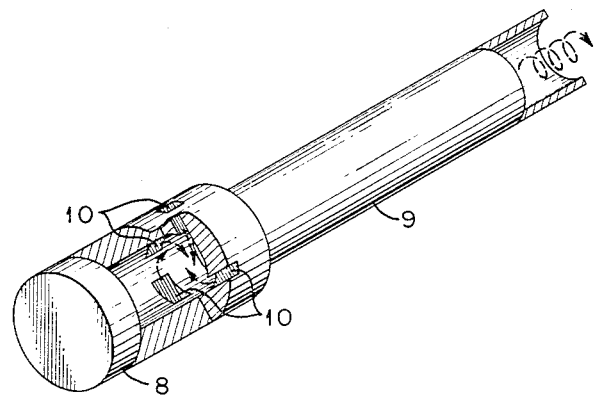
Fig. 4 is a perspective view of a tangential inlet generator.

The tangential inlet generator is shown in Fig. 4. Referring to that figure, the generator consists of a cap 8 which is securely affixed to a heat transfer tube 9. The cap 8 is provided with a multiplicity of tangential openings or slots 10. In operation, the capped end of the heat transfer tube is placed in any suitable pressurized reservoir of a fluid coolant. The coolant enters the tube by means of the tangential slots and flows through tube 9 as is indicated by the dotted arrow.

Of the two methods of imparting spin described above, the twisted tape method is preferred because a constant rotational velocity is maintained throughout the length of a tube using a tape, whereas the rotational velocity produced by an inlet generator decays if no reinforcement is provided. As between the two generators described, the tangential inlet type is preferred because fabrication is more easily accomplished.

Since the rotational component of velocity is constant throughout the length of a tube when a twisted tape is used to establish the spinning flow, the centrifugal acceleration is also constant at any given axial velocity. For tubes containing twisted tapes, the centrifugal acceleration expressed in g units may be computed as follows:

$$\text{Acceleration in } g \text{ units} = \frac{1.845}{D}\left(\frac{V_{ax}}{y}\right)^2$$

where:

$D$ = inside tube diameter in inches
$V_{ax}$ = superficial axial velocity of the flowing fluid in ft./sec. calculated using free flow area; and
$y$ = pitch of the twisted tape in tube-diameters/twist.

In heat transfer systems using the inlet generator method of creating a rotating flow of fluid, the rotational velocity of the fluid is not constant throughout the length of the tube, as was stated above. For this reason, the centrifugal acceleration at the tube wall decreases from the inlet to the outlet end of the tube. If degradation of the rotational velocity is kept to a minimum by reinforcing the flow, improvements in burnout heat flux of equal magnitude to those effected by twisted tapes may be achieved. Reinforcement may easily be provided by providing additional tangential slots in the heat transfer tube wall at points downstream from the inlet generator. The centrifugal acceleration may be computed by means of the following equation:

$$\text{Acceleration in } g \text{ units} = \frac{V_r^2}{gR}$$

where:

$V_r$ = rotational velocity at tube wall, ft./sec.;
$R$ = inside tube radius, ft.; and
$g$ = acceleration due to gravity.

In order to illustrate our invention in still greater detail, the following illustrative examples are offered:

*Example I*

Two nickel tubes having an inside diameter of 0.18 inch and an L/D ratio of 13.8 were subjected to burnout tests in the following manner.

Into one tube a twisted Inconel tape approximately 0.18 inch in diameter and having a twist pitch of 2.08 diameters per twist was placed. The tube was placed across the output of a 375 kw. transformer, water was passed through the tube at a superficial axial velocity of 156 ft./sec., and the tube was heated to the burnout point by slowly increasing the voltage across the tube. Calculations revealed that the pumping power being expended at the burnout point was approximately 2.6 H.P., and that the heat transfer rate at the burnout point was $32.7 \times 10^6$ B.t.u./hr./ft.$^2$.

As to the second of the above-described tubes, it was subjected to an identical test without using a twisted tape in its interior. The velocity of the water was adjusted so that the pumping power being expended at the burnout point was approximately 2.6 H.P., i.e., about 174 ft./sec. As before, the voltage across the tube was increased until the tube burned out, and calculations revealed that at the burnout point heat was being transferred at the rate of $13.6 \times 10^6$ B.t.u./hr./ft.$^2$.

*Example II*

A molybdenum tube having a length of 0.563 inch and an L/D ratio of 2.94 was placed across the output of a 375 kw. transformer. A tangential inlet generator, similar to the one shown in Figure 4, was attached at the inlet end of the test section. The generator was provided with eight tangential slots having dimensions of 0.031 × 0.100 inch. Coolant water having an inlet pressure of 850 lb./in.$^2$ gauge was passed through the generator and a spinning flow having a superficial axial component of velocity of 98.2 ft./sec. was established in the tube test section. By increasing the voltage to the point where burnout of the tube wall occurred, it was found that at the burnout point, heat was being transferred at the rate of $54.8 \times 10^6$ B.t.u./hr./ft.$^2$, and that the pumping power being expended was 4.35 H.P. Similar tests using axial flow revealed that at a pumping power of 4.35 H.P., a burnout heat transfer rate of only $19.5 \times 10^6$ B.t.u./hr./ft.$^2$ could be obtained.

The above detailed description of our invention was used for illustrative purposes only and should not be interpreted in a limiting sense. It is intended that our invention be limited only by the appended claims.

Having thus described our invention, we claim:

1. In the method of increasing burnout heat fluxes in tubes under conditions of localized boiling at the inner wall of said tubes by utilizing spinning flow, the improvement which comprises passing the fluid coolant through said tubes with a rotational component of velocity of sufficient magnitude to provide a centrifugal acceleration at the inner wall of said tube of at least 10,000 g.

2. The improvement of claim 1, wherein said rotational component of velocity is imparted by means of a twisted tape.

3. The improvement of claim 1, wherein said rotational component of velocity is imparted by means of an inlet generator.

References Cited in the file of this patent

UNITED STATES PATENTS

| | | |
|---|---|---|
| 1,770,208 | Kemnal | July 8, 1930 |
| 2,097,104 | Saha | Oct. 26, 1937 |
| 2,790,310 | Green | Apr. 30, 1957 |